United States Patent
Cohen

(10) Patent No.: US 12,141,592 B1
(45) Date of Patent: Nov. 12, 2024

(54) GENERATING AN APPLICATION SESSION CALL STACK REPRESENTING A UNIQUE IDENTIFIER

(71) Applicant: Meta Platforms, Inc., Menlo Park, CA (US)

(72) Inventor: Alexander Cohen, San Carlos, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 496 days.

(21) Appl. No.: 17/572,492

(22) Filed: Jan. 10, 2022

(51) Int. Cl.
G06F 9/44 (2018.01)
G06F 9/448 (2018.01)

(52) U.S. Cl.
CPC .................. *G06F 9/4484* (2018.02)

(58) Field of Classification Search
CPC .................................................. G06F 9/4484
See application file for complete search history.

(56) References Cited

U.S. PATENT DOCUMENTS

| | | | | |
|---|---|---|---|---|
| 8,607,201 B2* | 12/2013 | Chen | ................ | G06F 8/30 717/125 |
| 12,020,043 B2* | 6/2024 | Wang | ................ | G06F 9/44521 |
| 2004/0083292 A1* | 4/2004 | Lueckhoff | ............ | H04L 67/564 709/227 |
| 2011/0138365 A1* | 6/2011 | Schmelter | ........... | G06F 11/3404 717/130 |
| 2012/0239698 A1* | 9/2012 | Ohtake | ................ | G06F 16/25 707/E17.032 |
| 2013/0198572 A1* | 8/2013 | Han | ................ | G06F 11/3636 714/E11.2 |
| 2016/0283357 A1* | 9/2016 | Mu | ................ | G06F 9/44 |

* cited by examiner

*Primary Examiner* — Benjamin C Wu
(74) *Attorney, Agent, or Firm* — Greenberg Traurig, LLP

(57) ABSTRACT

The disclosed computer-implemented method may include systems and methods for embedding specific data into a call stack associated with an application session. For example, the systems and methods described herein can initialize a program thread that sequentially executes specialized application functions based on characters of a unique identifier to embed the unique identifier within a call stack of the application session. The systems and methods further provide the unique identifier in connection with other data sources associated with the application session such that further analysis of all data associated with the application session may be cross-referenced according to the unique identifier. Various other methods, systems, and computer-readable media are also disclosed.

20 Claims, 4 Drawing Sheets

GENERATING AN APPLICATION SESSION CALL STACK REPRESENTING A UNIQUE IDENTIFIER

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
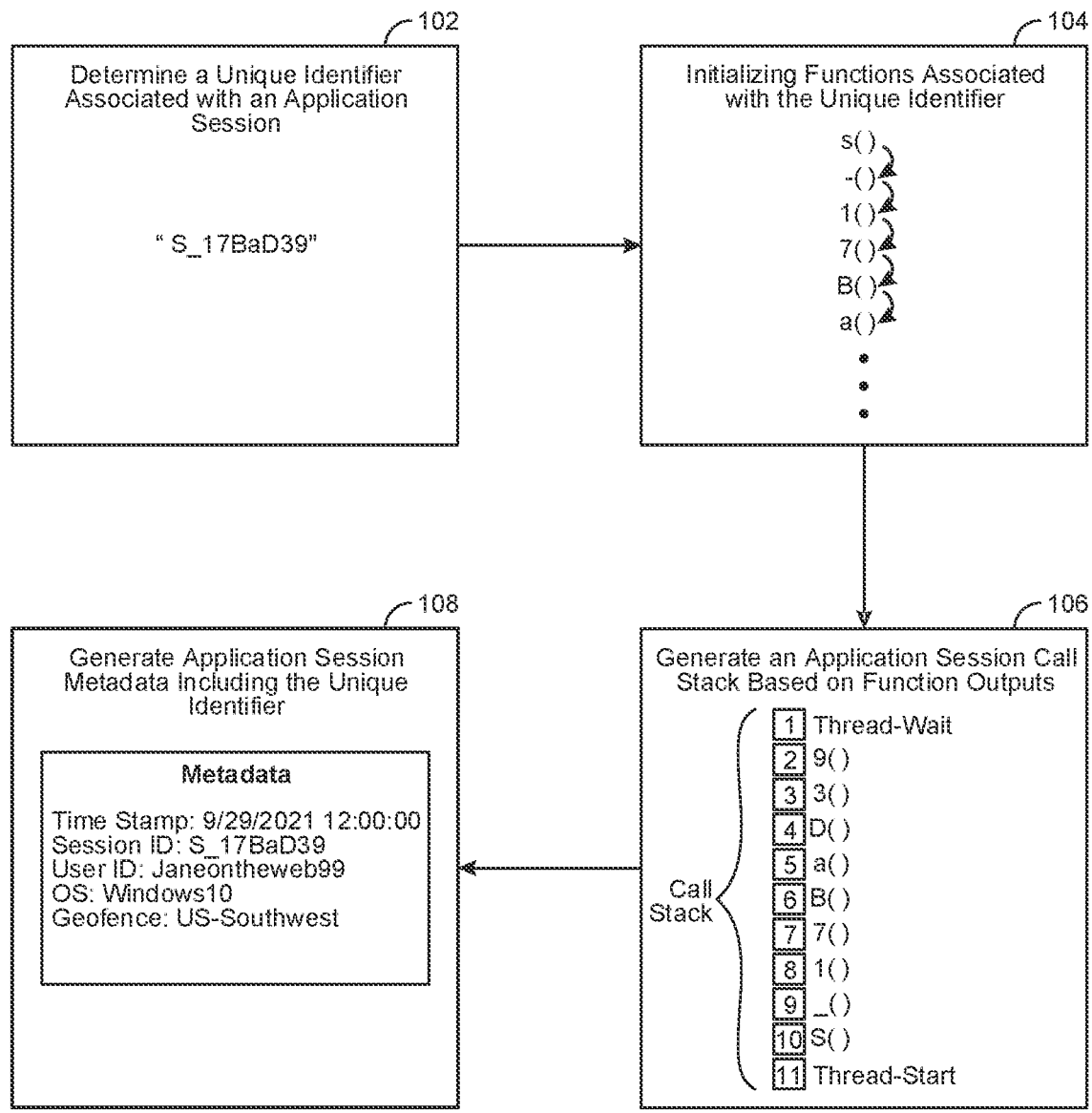
FIG. 1 illustrates an overview sequence diagram of a stack identifier system generating an application session call stack including a unique identifier that cross-references other metadata associated with the application according to one or more embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

In some examples, analytical systems enable various forms of data analysis following an application failure (e.g., a program crash). For example, analytical systems can include methods for collecting call stacks associated with the application session (e.g., for backtracing), as well as methods for collecting other types of metadata associated with the application session. Problems arise, however, when the application is installed across numerous client devices. For instance, in the event of an application bug, analytical systems often provide no way for call stacks and other metadata to be cross-referenced across all of the application sessions on all the affected client devices. Similarly, analytical systems generally provide no way to analyze and cross-reference various types of crash data associated with a single user device when the analytical systems include distributed components.

These shortcomings give rise to additional problems with regard to the computational flexibility, accuracy, and efficiency of the analytical systems. For example, some analytical systems are inflexible due to their use of siloed analytical data. To illustrate, as mentioned above, example analytical systems utilize call stack data and other metadata. Despite this, these analytical systems analyze each different type of data separately. For instance, such analytical systems analyze call stack data in a vacuum apart from any other type of data.

The separate analyses of various types of data inevitably lead to inaccurate analytical results. For instance, following an application crash on one or more client computing devices, example analytical systems may perform an analysis of call stack data followed by an analysis of other metadata associated with application sessions across affected client computing devices. Despite this, these separate analyses fail to generate accurate and insightful analytical results that consider the combination of all available data associated with the program failure. Instead, such analytical systems generate inaccurate analytical results based on partial data sets.

Moreover, example analytical systems are often inefficient. For example, some analytical systems generate computational waste in separately analyzing different types of data to generate an incomplete analytical result. To illustrate, such analytical systems waste processing, display, and memory resources in performing, displaying, and storing repetitive analyses of call stack data separate from metadata associated with application sessions. This is especially true in connection with the analyses performed by these analytical systems that result in an incomplete and inaccurate picture of the reasons why an application experienced a failure event.

The present disclosure is generally directed to systems and methods for generating an application session call stack embedded with a specific unique identifier that cross-references the application session call stack with other metadata associated with an application session. As will be explained in greater detail below, embodiments of the present disclosure describe a stack identifier system that may sequentially call application functions associated with a unique identifier during an application session and write outputs of the application functions to the application session call stack. The stack identifier system may then utilize the resulting application session call stack to generate, identify, and/or cross-reference other metadata associated with the application session in the event of a detected application failure.

As discussed above, example analytical systems suffer from various technical problems related to the functionality of a computing system. In one or more embodiments, the stack identifier system solves these and other technical issues by flexibly, accurately, and efficiently generating application failure data that can be cross-referenced across a single unique identifier to generate more complete analytical results.

For example, rather than utilizing a siloed data approach common to example analytical systems, the stack identifier system can generate call stack data that incorporates a unique identifier that cross-references an application session's call stack data with other related metadata. Thus, the stack identifier system can utilize a flexible approach that incorporates all of the relevant data associated with the application session for analysis following an application failure event.

By combining diverse data sets across the unique identifier, the stack identifier system can also generate more accurate analytical results. For example, rather than forcing inferences based on separate analyses of various data sets, the stack identifier system effectively cross-references data sets across a unique identifier such that accurate analytical results may be generated that are based on all relevant data associated with an application session.

Moreover, the stack identifier system's use of cross-referencing circumnavigates many wasteful computational steps associated with repetitive analytical tasks common to example analytical systems. For example, the stack identifier system improves the efficiency with which a computing device utilizes computational resources by initializing a single analysis of cross-referenced data sets for an application session-rather than repetitively analyzing disparate data sets associated with the application session. As such, the stack identifier system assists the computing device in using fewer processor cycles and less memory than other example analytical systems.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-4, detailed descriptions of the stack identifier system intelligently generating call stack data for an application session that includes a unique identifier. For example, FIG. 1 is an example overview diagram of the stack identifier system intelligently generating call stack data for use in generating more accurate and efficient analytical results. In one or more embodiments, as shown in FIG. 1, the stack identifier system can perform an act 102 of determining a unique identifier associated with an application session on a client computing device.

For instance, the stack identifier system can determine a unique identifier associated with an application session in various ways. In one or more embodiments, the stack identifier system determines the unique identifier by assigning a session ID for the application session as the unique identifier. In additional embodiments, the stack identifier system determines the unique identifier by assigning a user ID associated with the user of the application session as the unique identifier. In yet additional embodiments, the stack identifier system generates a randomly-seeded alpha-numeric character string as the unique identifier. In another additional embodiment, the stack identifier system receives the unique identifier from another module of the application.

After determining the unique identifier, the stack identifier system can perform an act 104 of initializing application functions associated with the unique identifier. For example, and as will be discussed in greater detail below, the stack identifier system can initialize application functions associated with the unique identifier by sequentially call application functions that each map to individual characters of the unique identifier. In at least one embodiment, the stack identifier system sequentially initializes application functions associated with the characters of the unique identifier until the end of the unique identifier is reached.

As further shown in FIG. 1, the stack identifier system can perform an act 106 of generating an application session call stack based on the application function outputs. For example, in one or more embodiments, the stack identifier system generates the application session call stack by writing the outputs of the sequentially initialized application function to a dedicated call stack. In at least one embodiment, after writing the application function outputs to the call stack, the stack identifier system can wait until at least one of the application session ending (e.g., due to a user-initiated application exit), or detection of an application failure event (e.g., a program crash). Additionally, the stack identifier system can wait until detection of any other type of predetermined application event.

In one or more embodiments, the stack identifier system can further perform an act 108 of generating application metadata including the unique identifier. For example, the stack identifier system can generate application metadata including, but not limited to: user account information associated with the user of the application session (e.g., a user ID, an account ID, user demographic information, user application activity), information associated with the client computing device where the application session was hosted or initialized (e.g., operating system information, network information, geographic information), and a timestamp associated with generation or collection of the metadata. Additionally, in at least one embodiment, the stack identifier system can generate the application session metadata in response to detecting a failure event associated with the application session.

Following the acts 102-108 described with reference to FIG. 1, the stack identifier system can perform various additional tasks. For example, in one embodiment, the stack identifier system can perform analysis of the application session call stack information cross-referenced with the generated application session metadata across the unique identifier. In additional embodiments, the stack identifier system sends the application session call stack information (e.g., including the call stack that spells out the unique identifier) along with the application session metadata to a third-party analytical system. In yet additional embodiments, the stack identifier system stores the application session call stack information and the application session metadata within a data storage that is indexed based on the unique identifier.

Figure 2:
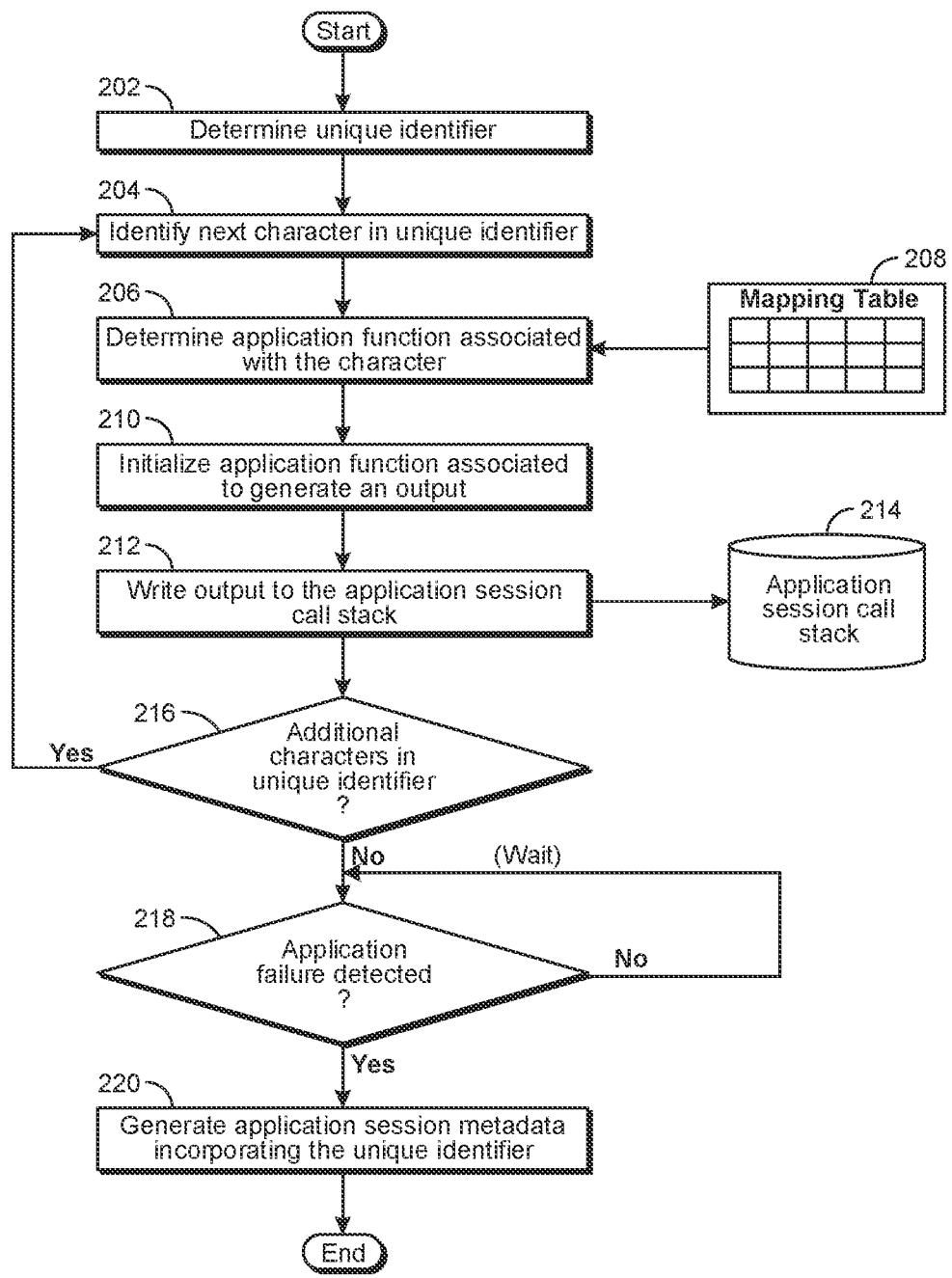
FIG. 2 illustrates a sequence diagram of the stack identifier system sequentially initializing application functions to generate a unique identifier within an execution thread call stack according to one or more embodiments.

FIG. 2 illustrates a sequence diagram of the stack identifier system generating application session call stack information in greater detail. The steps shown in FIG. 2 may be performed by any suitable computer-executable code and/or computing system, including the system(s) illustrated below with reference to FIG. 3. In one example, each of the steps shown in FIG. 2 may represent an algorithm whose structure includes and/or is represented by multiple sub-steps, examples of which will be provided in greater detail below.

For example, as mentioned above, the stack identifier system can perform an act 202 of determining a unique identifier associated with an application session on a client computing device. In one or more embodiments, the stack identifier system determines the unique identifier by identifying a session identifier associated with the application session and assigns the session identifier as the unique identifier. In additional embodiments, the stack identifier system determines the unique identifier by identifying another identifier (e.g., a user identifier, an account identifier, a media access control address) and assigning that identifier as the unique identifier, or by generating the unique identifier based on a random character generator.

In one or more embodiments, the stack identifier system determines the unique identifier in response to different application events. For example, in one embodiment, the stack identifier system determines the unique identifier in response to activation or initialization of the application on the client computing device. In additional embodiments, the stack identifier system determines the unique identifier in response to detecting a predetermined event within the initialized application. To illustrate, the stack identifier system can determine the unique identifier in response to detecting a sign-in event (e.g., detecting that an account associated with the application has had a successful sign-in on the client computing device), in response to a file event (e.g., opening or closing a predetermined file), in response to determining that the application has been active for a predetermined amount of time, and/or in response to determining that the application has received focus.

The stack identifier system can further perform an act 204 of identifying a next character in the unique identifier. For example, in one embodiment, the stack identifier system maintains the unique identifier as a linked list of individual alpha-numeric characters with pointer or index pointing to a next character to be processed. In that embodiment, the stack identifier system identifies a next character in the unique identifier by identifying the character within the linked list currently associated with the pointer. As such, immediately following determining the unique identifier, the stack identifier system identifies the next character in the unique identifier by identifying the first character in the unique identifier.

The stack identifier system also performs an act 206 of determining an application function associated with the identified character. In more detail, prior to application runtime, the stack identifier system can generate a series of application functions associated with the application. For example, the stack identifier system can generate application functions that are each associated with or named according to a particular alpha-numeric character (e.g., A-Z, a-z, 0-9, etc.). In one or more embodiments, the stack identifier system generates each application function to read in the determined unique identifier, as well as the pointer to a current character within the unique identifier.

In at least one embodiment, the stack identifier system can further generate the collection of application functions such that each application function performs the same tasks. For example, in one embodiment, the stack identifier system generates each application function to include routines that 1) generate a call stack output associated with the current character within the unique identifier (e.g., as indicated by the pointer), 2) determine a next character within the unique identifier, and 3) call an application function associated with the next character.

Furthermore, in response to generating the collection of application functions, the stack identifier system can also generate a mapping table 208. In one or more embodiments, the stack identifier system generates the mapping table 208 to include indications of the generated application functions as well as the alpha-numeric characters with which each application function is associated. To illustrate, the stack identifier system can generate the mapping table 208 to indicate: the function "A( )" maps to the alpha-numeric character "A," the function "B( )" maps to the alpha-numeric character "B," the function "C( )" maps to the alpha-numeric character "C," and so forth. The stack identifier system can generate the mapping table 208 as a standard table where each row includes a column for the application function and a column for the associated alpha-numeric character. In additional embodiments, the stack identifier system can generate the mapping table 208 as a hash table, a linked list, a comma-separated value list, or any other suitable data structure.

Accordingly, in the act 206, the stack identifier system can determine an application function associated with the current character from the unique identifier utilizing the mapping table 208. For example, the stack identifier system can identify the current character in the mapping table 208, then determine the application function associated with the current character within the mapping table 208.

After determining the application function associated with the current character, the stack identifier system can perform the act 210 of initializing the determined application function to generate an output. As mentioned above, prior to runtime, the stack identifier system can generate the collection of application functions to generate a predetermined output to a call stack. Thus, the stack identifier system can initialize the determined application function by calling that application function with the unique identifier and current character pointer as inputs—thereby causing the application function to generate an output including the character within the unique identifier pointed to by the current character pointer.

In one or more embodiments, the stack identifier system further performs an act 212 of writing the output of the application function to an application session call stack 214. In at least one embodiment, the stack identifier system performs the acts 202-216 by initializing a program thread. Accordingly, the stack identifier system can perform the act 212 by writing the output of the application function the application call stack 214 associated with that program thread. More specifically, the stack identifier system can write the output of the application function to the application call stack by allowing the program thread to initialize the application function, thereby automatically writing the name of the initialized application function to the application call stack 214. In one or more embodiments, the application session call stack 214 is a last-in-first-out data stack such that the first character output written to the application session call stack 214 resides at the bottom of the application session call stack 214.

The stack identifier system further performs an act 216 of determining whether there are additional characters in the unique identifier. In one or more embodiments, the stack identifier system determines whether there are additional characters in the unique identifier by incrementing the character pointer within the unique identifier to a next character. As mentioned above, in at least one embodiment, the stack identifier system generates each application function in the collection of functions to perform the same routines including generating a call stack output (i.e., as in the acts 210-212), determining the next character within the unique identifier (i.e., as in the acts 216 and 204), and calling an application function associated with the next character (i.e., as in the act 206). Accordingly, in response to incrementing the character pointer within the unique identifier and determining that a character is at that position within the unique identifier (e.g., "Yes" in the act 216), the stack identifier system can repeat the acts 204-216. In at least one embodiment, the stack identifier system repeats the acts 204-216 by enabling the program thread to continue running within the application and writing names of initialized application functions to the application session call stack 214—thereby spelling out the characters of the unique identifier into the application session call stack 214.

In response to determining that there is no character at the incremented position within the unique identifier (e.g., "No" in the act 216), the stack identifier system can perform an act 218 of determining whether an application failure is detected. In one or more embodiments, the stack identifier system determines whether an application failure is detected by utilizing event listeners to monitor various application events. In additional embodiments, the stack identifier system determines whether an application failure is detected by periodically checking system logs for predetermined event indicators. In response to determining that no application failure is detected (e.g., "No" in the act 218), the stack identifier system continues to repeat the act 218. In other words, in at least one embodiment, after writing the unique identifier to the application session call stack, the stack identifier system waits until an application failure event is detected. For instance, the stack identifier system can wait by instructing the program thread to wait following generation of the application session call stack such that the application session call stack is maintained. As mentioned above, in additional alternatives the stack identifier system can wait until any predetermined application event is recognized.

In response to determining that an application failure is detected (e.g., "Yes" in the act 218, the stack identifier system can perform an act 220 of generating application session metadata that incorporates the unique identifier. For example, as mentioned above, the stack identifier system can generate application session metadata associated with the user of the client computing device, as well as application session metadata associated with the client computing device. In at least one embodiment, the stack identifier system further generates the application session metadata to incorporate or otherwise include the unique identifier.

In one or more embodiments, the stack identifier system generates and stores the application session metadata outside the application session call stack 214. For example, the stack identifier system can store the application session metadata in a database or file outside of the application session call stack 214. In additional embodiments, the stack identifier system provides the generated application session metadata to one or more analytical systems immediately following generation of the same. In other additional embodiments, the stack identifier system can generate the application session metadata prior to detecting an application failure event, or at any time following initialization of the application session.

In one or more embodiments, and following the acts illustrate in FIG. 2, the stack identifier system can provide the application session call stack 214 and the generated application session metadata for additional analysis. For example, in one embodiment, the stack identifier system performs the additional analysis. In additional embodiments, the stack identifier system provides the data to one or more analytical systems. For instance, in at least one embodiment, the stack identifier system may provide the different types of data along with the unique identifier to additional analytical systems. In that embodiment, the stack identifier system provides the unique identifier as an index that correlates the different types of data together across an application session. Regardless of the system that performs the additional analysis, the unique identifier cross-references the call stack information and other metadata resulting in more accurate analytical results-particularly in connection with common application failures across a large number of client computing device (e.g., as may occur in connection with a programming bug in the application).

Although the stack identifier system is described in FIG. 2 and throughout as embedding a unique identifier into the application session call stack 214, in additional embodiments, the stack identifier system can embed any type of data into the application session call stack 214. For example, the stack identifier system can embed a log file name, a web address, a timestamp, or any other information that can be represented with alpha-numeric characters.

As shown in connection with FIG. 2, the methods and acts performed by the stack identifier system reference multiple terms. More detail regarding these terms is now provided. For example, in some embodiments, the term "unique identifier" may refer to one or more characters that are unique to an application session on a client computing device. Examples of a unique identifier include, without limitation, a sequence of alpha-numeric characters specific to an application session on a client computing device. For example, a "character" can include a lower-case letter, an upper-case letter, a number, or other symbol (e.g., punctuation, special characters). In some embodiments, characters can include English language letters and/or numbers. In additional embodiments, characters can include letters and/or numbers in other languages.

In some embodiments, the stack identifier system stores a unique identifier in a structure, such as a linked list. For example, the stack identifier system can store the unique identifier in a linked list including each character of the unique identifier linked together with pointers. Accordingly, in some embodiments and as discussed above, the stack identifier system processes a unique identifier one character at a time by incrementing a character pointer. As used herein, the term "character pointer" can refer to a pointer associated with the linked list of characters in a unique identifier that points to a current character within the unique identifier. Furthermore, as used herein, the term "next character" can refer to a character in the linked list of characters associated with the unique identifier that resides at a location pointed to by the character pointer after the character pointer is incremented. In at least one embodiment, the linked list of characters includes a terminal character that indicates the end of the unique identifier.

In some embodiments, the term "sequentially initialize" may refer to a process by which the stack identifier system initializes application functions in a predetermined order. Examples of sequential initialization include, without limitation, the stack identifier system initializing application functions one-by-one in an order that correlates with an order of characters in a unique identifier. In some embodiments, the term "application function" may refer to a set of programmed steps that each accomplish an outcome and/or generate an output. Examples of application functions include, without limitation, individually named functions that each correspond with a character (e.g., alpha-numeric, special symbols, punctuation), accept input including the unique identifier and the character pointer, lookup an application function associated with a next character in the unique identifier, and call the application function corresponding to the next character in the unique identifier.

In some embodiments, the term "application session call stack" may refer to a data structure that stores and maintains data about active subroutines associated with an application. For example, upon initialization of an application session (e.g., in response to a user opening the application, logging into an account, etc.), the stack identifier system can initialize one or more dedicated program threads. As used herein, a "dedicated program thread" may refer to a thread of execution within an application. In one or more embodiments, the stack identifier system writes information to call stacks associated with each of the one or more dedicated program threads that includes each application function that is activated or initialized by the program execution thread. As such, an application session call stack may be organized as a last-in-first-out stack where the first application function called is at the bottom of the application session call stack.

In some embodiments, the term "application session metadata" may refer to information associated with the application session. Examples of application session metadata include, without limitation, user information associated with the user of the application session (e.g., username, account ID, demographic information), client computing device associated with the application session (e.g., IP address, MAC address, operating system information, device specifications), and information associated with the application session (e.g., initialization timestamp, activity history).

In some embodiments, the term "mapping table" may refer to a data structure that stores information. Examples of mapping tables include, without limitation databases, linked lists, hash tables, comma separated value files, or row and column tables. In one or more embodiments, a mapping table includes information that correlates or maps one type or body of data to another type or body of data. As used herein, a mapping table maps characters from a unique identifier with application functions.

Figure 3:
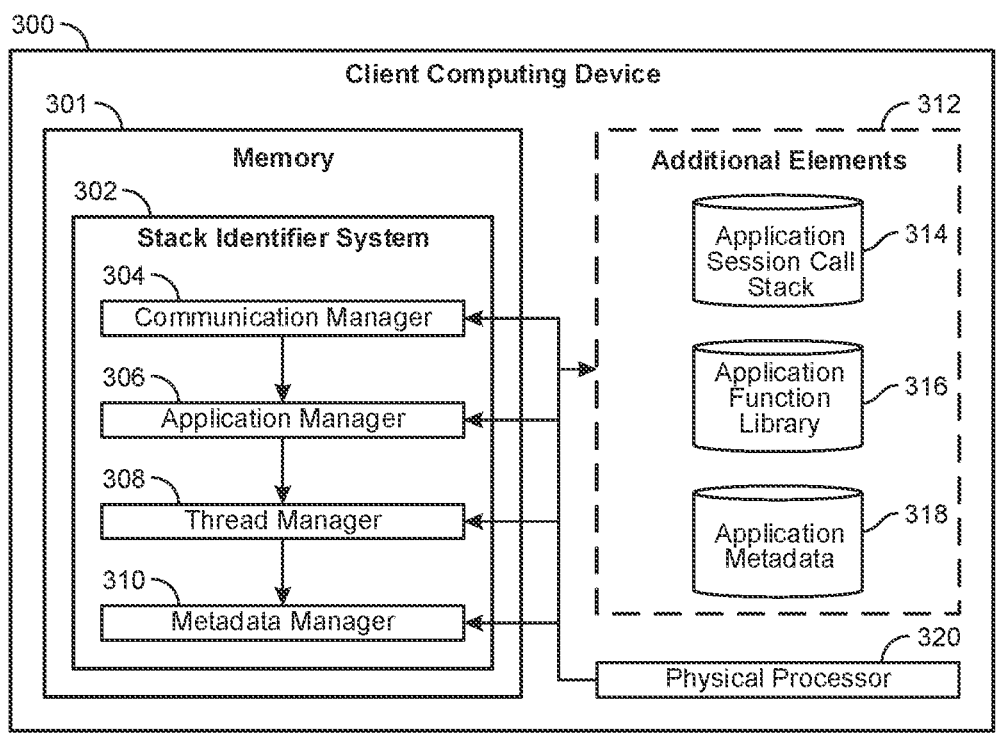
FIG. 3 illustrates a schematic diagram of the stack identifier system according to one or more embodiments.

FIG. 3 illustrates a block diagram of a stack identifier system 302 (e.g., the stack identifier system as described above) operating on a client computing device 300. As shown, the stack identifier system 302 can include a communication manager 304, an application manager 306, a thread manager 308, and a metadata manager 310. Although illustrated as separate elements, one or more of the components 304-310 of the stack identifier system 302 may be combined in additional embodiments. Similarly, in additional embodiments, the stack identifier system 302 may include additional, fewer, or different components.

In certain embodiments, the stack identifier system 302 may represent one or more software applications or programs that, when executed by a computing device, may cause the computing device to perform one or more tasks. For example, and as will be described in greater detail below, one or more of the components 304-310 of the stack identifier system 302 may represent software stored and configured to run on one or more computing devices, such as the devices illustrated below in FIG. 4 (e.g., the client computing device 300 and/or a server 404). One or more of the components 304-310 of the stack identifier system 302 shown in FIG. 3 may also represent all or portions of one or more special-purpose computers configured to perform one or more tasks.

As mentioned above, and as shown in FIG. 3, the stack identifier system 302 can include the communication manager 304. In one or more embodiments, the communication manager 304 handles communication tasks associated with the process for generating and providing stack data that is cross-referenced to other metadata according to a unique identifier. For example, the communication manager 304 can provide a generated application session call stack including a unique identifier-either alone or in combination with other application session call stacks and/or application session metadata—to one or more servers or additional analytical systems.

Additionally, and as mentioned above, the stack identifier system 302 can include the application manager 306. In one or more embodiments, the application manager 306 generates a collection of application functions as well as a mapping table that correlates the generated application functions with specific characters. For example, in one embodiment, the application manager 306 generates the collection of application functions, where each application function correlates with a specific character. The application manager 306 can further generate each application function to perform the same tasks. More specifically, the application manager 306 can generate each application function to accept input parameters including a unique identifier and a character pointer indicating a character within the unique identifier to process. The application manager 306 can further generate each application function to write the character within the unique identifier indicated by the pointer to an application session call stack, increment the character pointer within the unique identifier, lookup an application function associated with the new character within the unique identifier indicated by the incremented character pointer, and call the identified application function with the unique identifier and character pointer as input parameters.

Moreover, and as mentioned above, the stack identifier system 302 can include the thread manager 308. In one or more embodiments, the thread manager 308 manages processing of a unique identifier as discussed herein. For example, in response to the stack identifier system 302 determining a unique identifier for an application session, the thread manager 308 can initialize a program execution thread that utilizes the collection of application functions discussed above to write the unique identifier—character by character—to the application session call stack associated with that program execution thread. In at least one embodiment, in response to encountering a terminal character of the unique identifier, the thread manager 308 can further instruct the program execution thread to wait, thereby maintaining the generated application session call stack until either the application session in response to a user-event (e.g., closing the application, logging off of an account), or the application session experiences a failure event (e.g., a program crash).

As further mentioned above, the stack identifier system 302 can include the metadata manager 310. In one or more embodiments, the metadata manager 310 can generate metadata associated with an application session. Additionally, in one or more embodiments, the metadata manager 310 further adds or correlates the unique identifier associated with the application session to the metadata.

As further illustrated in FIG. 3, the client computing device 300 can store and maintain the stack identifier system 302 in a memory 301. The memory 301 generally represents any type or form of volatile or non-volatile storage device or medium capable of storing data and/or computer-readable instructions. In one example, the memory 301 may store, load, and/or maintain one or more of the components 304-310 of the stack identifier system 302. Examples of the memory 301 can include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Also as illustrated in FIG. 3, the client computing device 300 may also include one or more physical processors, such as a physical processor 320. The physical processor 320 generally represents any type or form of hardware-implemented processing unit capable of interpreting and/or executing computer-readable instructions. In one embodiment, the physical processor 320 may access and/or modify one or more of the components 304-310 of the stack identifier system 302. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Additionally, as shown in FIG. 3, the client computing device 300 may also include one or more additional elements 312. For example, in one or more embodiments, the additional elements 312 can include additional data storage including an application session call stack 314, an application function library 316, and application metadata 318. In one or more embodiments, the application session call stack 314 is written to by one or more of the application functions in the application function library 316 as dictated by the thread manager 308. Similarly, the application metadata 318 includes application session metadata generated by the metadata manager 310.

Figure 4:
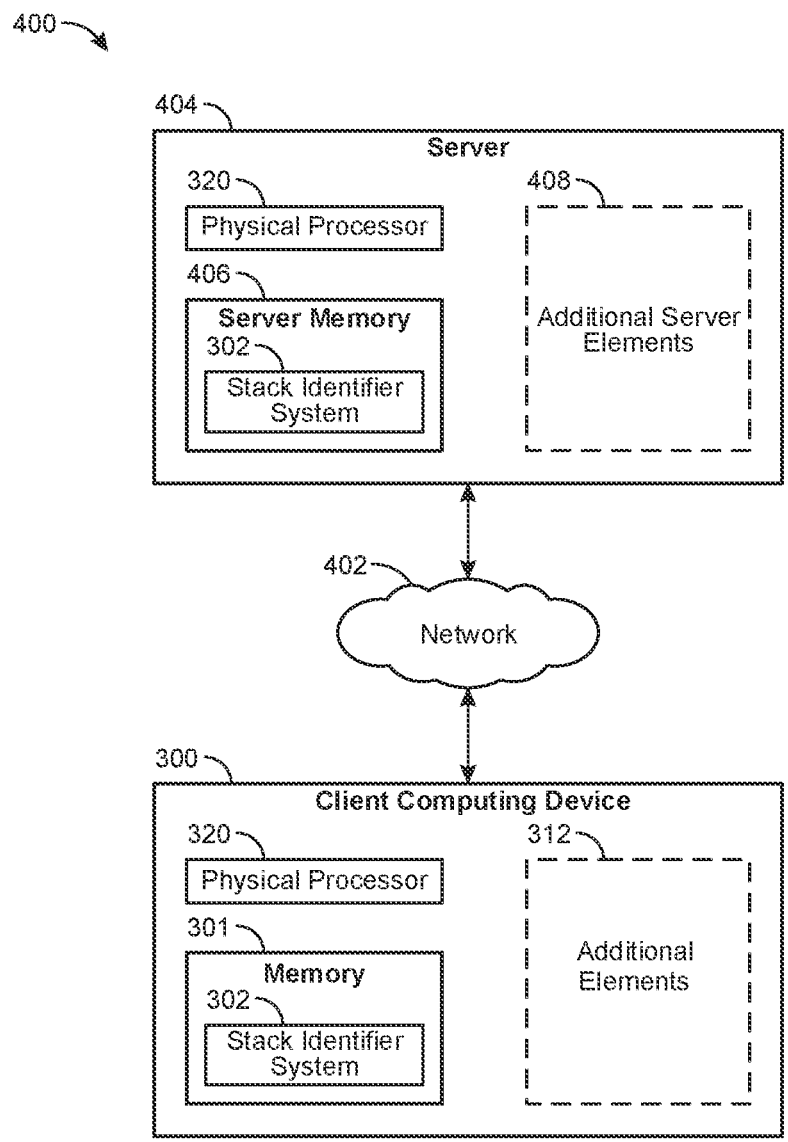
FIG. 4 illustrates a network environment in which the stack identifier system operates according to one or more embodiments.

FIG. 4 illustrates an exemplary network environment 400 implementing aspects of the present disclosure. For example, the network environment 400 can include the client computing device 300, a network 402, and a server 404. As discussed above, in one or more embodiments, the stack identifier system 302 can be implemented by the client computing device 300 including the memory 301, the physical processor 320, and the additional elements 312.

In additional embodiments, the stack identifier system 302 may be similarly implemented—in part or in whole—by the server 404. In one or more embodiments, the server 404 can include a physical processor 320 (e.g., similar to the client computing device 300), along with a server memory 406 and additional server elements 408. For example, when at least partially implemented on the server 404, the stack identifier system 302 can provide a unique identifier to the client computing device 300 where one or more of the components of the stack identifier system 302 generate an application session call stack, as described above. Those components can communicate the generated application session call stack to the server 404, where additional components of the stack identifier system 302 generate additional metadata and either store the application session call stack and metadata or communicate the application session call stack and metadata to an additional analytical system for further analysis.

The client computing device 300 may be communicatively coupled to the server 404 through the network 402. The network 402 may represent any type or form of communication network, such as the Internet, and may comprise one or more physical connections, such as a LAN, and/or wireless connections, such as a WAN.

In summary, the disclosed stack identifier system 302 can include a collection or group of application functions that are each mapped to specific alpha-numeric characters. In response to receiving or otherwise determining a unique identifier associated with an application session on a client computing device, the stack identifier system 302 can utilize the collection of application functions to embed the unique identifier—or any other type of data—within a call stack for the application. For example, the stack identifier system 302 can initialize a program thread that sequentially executes application functions that map to the characters of the unique identifier, thereby spelling the unique identifier out within the call stack via the names of the initialized application functions. The stack identifier system 302 can further include or provide the unique identifier within additional metadata associated with the application session such that the call stack data and the additional metadata for the application session can be quickly and effectively cross-referenced according to the unique identifier. Accordingly, by flexibly enabling cross-referencing between disparate data sources, the stack identifier system improves the accuracy of further data analysis while saving computing resources that would otherwise be wasted in extensive analysis of partial data sets.

EXAMPLE EMBODIMENTS

Example 1: A computer-implemented method for generating application session call stack data including a cross-referenced unique identifier may include generating a unique identifier associated with an application session; sequentially initializing application functions associated with characters of the unique identifier; generating, based on outputs of the application functions, an application session call stack representing the unique identifier; and generating application session metadata that comprises the unique identifier and that is available outside the application session call stack.

Example 2: The computer-implemented method of Example 1, further comprising generating a mapping table associating potential identifier characters to application functions.

Example 3: The computer-implemented method of any of Examples 1 and 2, wherein sequentially initializing the application functions associated with the characters of the unique identifier comprises, for each character in the unique identifier: determining, utilizing the mapping table, an application function associated with the character; generating, with the application function associated with the character, an output associated with the character; and writing the output to the application session call stack.

Example 4: The computer-implemented method of any of Examples 1-3, wherein determining the application function associated with the character comprises: identifying the character in the mapping table; and identifying an application function that is correlated with the character within the mapping table.

Example 5: The computer-implemented method of any of Examples 1-4, wherein sequentially initializing the application functions associated with the characters of the unique identifier further comprises, after writing the output of the application session call stack, determining a next application function to initialize based on the unique identifier.

Example 6: The computer-implemented method of any of Examples 1-5, wherein determining the next application function to initialize based on the unique identifier comprises incrementing a character pointer within the unique identifier to a next character.

Example 7: The computer-implemented method of any of Examples 1-6, wherein sequentially initializing the application functions associated with the characters of the unique identifier is in response to initialization of a dedicated program thread.

Example 8: The computer-implemented method of any of Examples 1-7, wherein generating the application session metadata that comprises the unique identifier is in response to a detected application failure.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory" or "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive [data] to be transformed, transform the [data], output a result of the transformation to [perform a function], use the result of the transformation to [perform a function], and store the result of the transformation to [perform a function]. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   determining a unique identifier associated with an application session;
   sequentially initializing application functions associated with characters of the unique identifier;
   generating, based on outputs of the application functions, an application session call stack representing the unique identifier; and
   generating application session metadata that comprises the unique identifier and that is available outside the application session call stack.

2. The computer-implemented method as recited in claim 1, further comprising generating a mapping table associating potential identifier characters to application functions.

3. The computer-implemented method as recited in claim 2, wherein sequentially initializing the application functions associated with the characters of the unique identifier comprises, for each character in the unique identifier:
   determining, utilizing the mapping table, an application function associated with the character;
   generating, with the application function associated with the character, an output associated with the character; and
   writing the output to the application session call stack.

4. The computer-implemented method as recited in claim 3, wherein determining the application function associated with the character comprises:
   identifying the character in the mapping table; and
   identifying an application function that is correlated with the character within the mapping table.

5. The computer-implemented method as recited in claim 4, wherein sequentially initializing the application functions associated with the characters of the unique identifier further comprises, after writing the output of the application session call stack, determining a next application function to initialize based on the unique identifier.

6. The computer-implemented method as recited in claim 5, wherein determining the next application function to initialize based on the unique identifier comprises incrementing a character pointer within the unique identifier to a next character.

7. The computer-implemented method as recited in claim 1, wherein sequentially initializing the application functions associated with the characters of the unique identifier is in response to initialization of a dedicated program thread.

8. The computer-implemented method as recited in claim 1, wherein generating the application session metadata that comprises the unique identifier is in response to a detected application failure.

9. A system comprising:
at least one physical processor; and
physical memory comprising computer-executable instructions that, when executed by the physical processor, cause the physical processor to:
determine a unique identifier associated with an application session;
sequentially initialize application functions associated with characters of the unique identifier;
generate, based on outputs of the application functions, an application session call stack representing the unique identifier; and
generate application session metadata that comprises the unique identifier and that is available outside the application session call stack.

10. The system as recited in claim 9, wherein the instructions further comprise instructions that cause the physical processor to generate a mapping table associating potential identifier characters to application functions.

11. The system as recited in claim 10, wherein the instructions further comprise instructions that cause the physical processor to sequentially initialize the application functions associated with the characters of the unique identifier by, for each character in the unique identifier:
determining, utilizing the mapping table, an application function associated with the character;
generating, with the application function associated with the character, an output associated with the character; and
writing the output to the application session call stack.

12. The system as recited in claim 11, wherein determining the application function associated with the character comprises:
identifying the character in the mapping table; and
identifying an application function that is correlated with the character within the mapping table.

13. The system as recited in claim 12, wherein the instructions further comprise instructions that cause the physical processor to sequentially initialize the application functions associated with the characters of the unique identifier by, after writing the output of the application session call stack, determining a next application function to initialize based on the unique identifier.

14. The system as recited in claim 13, wherein determining the next application function to initialize based on the unique identifier comprises incrementing a character pointer within the unique identifier to a next character.

15. The system as recited in claim 9, wherein the instructions further comprise instructions that cause the physical processor to sequentially initialize the application functions associated with the characters of the unique identifier in response to initialization of a dedicated program thread.

16. The system as recited in claim 9, wherein the instructions further comprise instructions that cause the physical processor to generate the application session metadata that comprises the unique identifier in response to a detected application failure.

17. A non-transitory computer-readable medium comprising one or more computer-executable instructions that, when executed by at least one processor of a computing device cause the computing device to:
determine a unique identifier associated with an application session;
sequentially initialize application functions associated with characters of the unique identifier;
generate, based on outputs of the application functions, an application session call stack representing the unique identifier; and
generate application session metadata that comprises the unique identifier and that is available outside the application session call stack.

18. The non-transitory computer-readable medium as recited in claim 17, further comprising one or more computer executable instructions that, when executed by the at least one processor of the computing device cause the computing device to sequentially initialize application functions associated with characters of the unique identifier by:
determining an application function associated with the character;
generating, with the application function associated with the character, an output associated with the character;
writing the output to the application session call stack; and
determining a next application function to initialize based on the unique identifier.

19. The non-transitory computer-readable medium as recited in claim 18, further comprising one or more computer executable instructions that, when executed by the at least one processor of the computing device cause the computing device to sequentially initialize the application functions associated with the characters of the unique identifier in response to initialization of a dedicated program thread.

20. The non-transitory computer-readable medium as recited in claim 19, further comprising one or more computer executable instructions that, when executed by the at least one processor of the computing device cause the computing device to generate the application session metadata that comprises the unique identifier in response to a detected application failure.

* * * * *